United States Patent [19]

Simpson

[11] Patent Number: 5,754,702
[45] Date of Patent: May 19, 1998

[54] SCALE ORIENTED INTERBAND PREDICTION METHOD FOR IMAGE DATA COMPRESSION AND RECONSTRUCTION

[75] Inventor: Robert Gordon Simpson, Ellicott City, Md.

[73] Assignee: Allied Signal Inc., Morristown, N.J.

[21] Appl. No.: 832,323

[22] Filed: Mar. 26, 1997

Related U.S. Application Data

[63] Continuation of Ser. No. 603,693, Feb. 20, 1996, abandoned, which is a continuation of Ser. No. 349,161, Dec. 2, 1994, abandoned.

[51] Int. Cl.$^6$ .............................. G06K 9/36; G06K 9/46
[52] U.S. Cl. .................. 382/240; 382/233; 382/248
[58] Field of Search .............................. 382/240, 248, 382/249, 253, 232, 233, 276, 281, 238; 348/398, 400, 411

[56] References Cited

U.S. PATENT DOCUMENTS

| | | | |
|---|---|---|---|
| 4,809,350 | 2/1989 | Shimoni et al. | 382/56 |
| 4,995,036 | 2/1991 | Copen et al. | 370/118 |
| 5,048,111 | 9/1991 | Jones et al. | 382/56 |
| 5,065,447 | 11/1991 | Barnsley et al. | 382/56 |
| 5,177,796 | 1/1993 | Feig et al. | 382/56 |
| 5,182,642 | 1/1993 | Gersdorff et al. | 358/133 |
| 5,228,098 | 7/1993 | Crinon et al. | 382/56 |
| 5,278,915 | 1/1994 | Chupeau et al. | 382/1 |
| 5,282,256 | 1/1994 | Ohsawa et al. | 382/56 |
| 5,297,219 | 3/1994 | Weldy | 382/54 |
| 5,321,776 | 6/1994 | Shapiro | 382/56 |

OTHER PUBLICATIONS

R. Rinaldo, et al "Coding by Block Prediction of Multiresolution Sumimages" (no date).

Li et al. "A Study of Vector Transform Coding of Subband-–Decomposed Images," IEEE Trans. on Circuit and Syst. for Video Technol. vol. 4, No. 4, pp. 383–391, Aug. 1994.

Furlan et al. "Sub–band Coding of Images Using Adaptive VQ and Entropy Coding," IEEE ICASSP '91, pp. 2665–2668, 1991.

*Primary Examiner*—Leo Boudreau
*Assistant Examiner*—Phuoc Tran
*Attorney, Agent, or Firm*—Verne E. Kreger, Jr.; Howard G. Massung

[57] ABSTRACT

An interband prediction method for image data decomposition and reconstruction in which a coder decomposes image data using pyramid subband image data decomposition. The resulting DC subband is further decomposed and is used to generate first predictors for various allowed geometries. The method then generates a predictor set for each pixel in the decomposed image in which the predictors for each pixel are ranked. The method further generates a message identifying the predictor in each predictor set to be used in the reconstruction of the data. In the reconstruction of the image data, the DC subband image data is used to generate a second predictor set identical to the first predictor list. The desired predictor for each pixel identified by the messages is used in conjunction with the DC subband image data to generate estimated next-level DC subband image data. This process is repeated until the estimated next-level DC subband image data is a predicted estimate of the original image data.

8 Claims, 7 Drawing Sheets

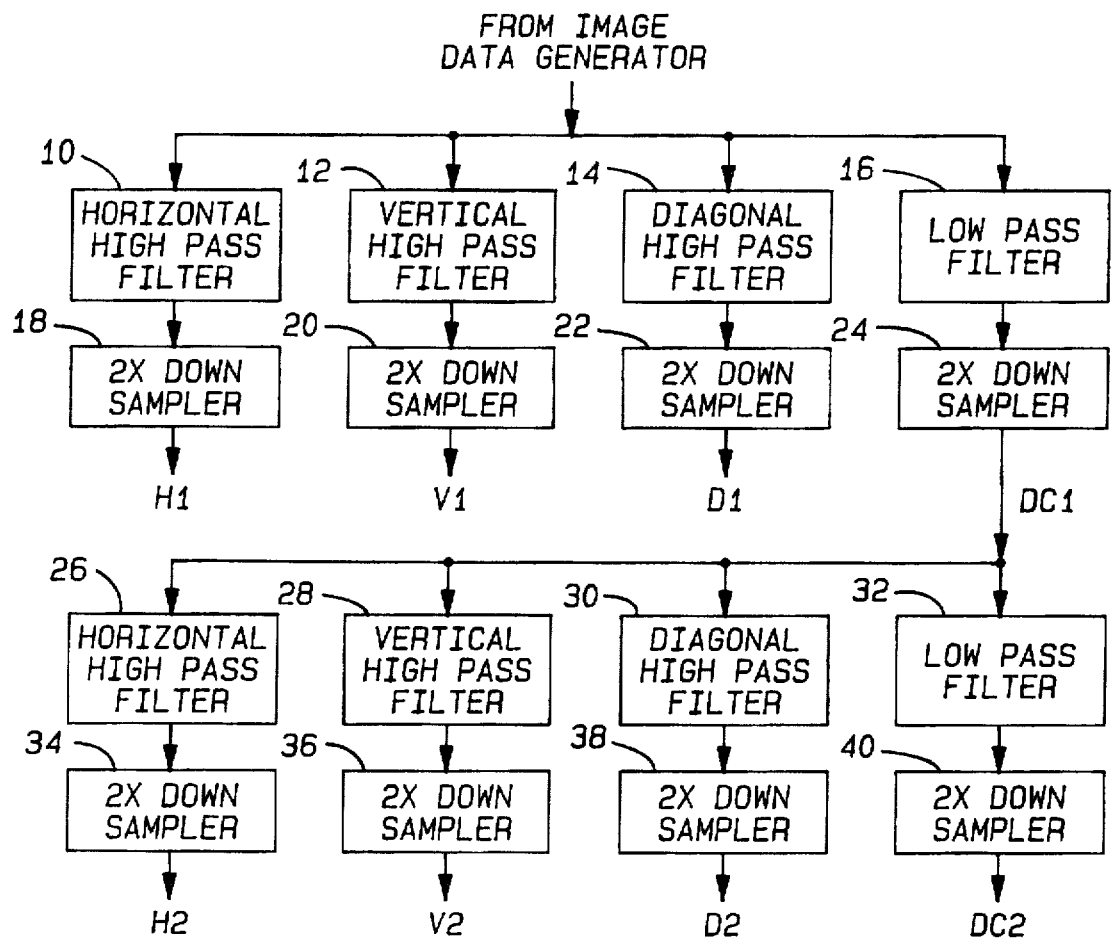
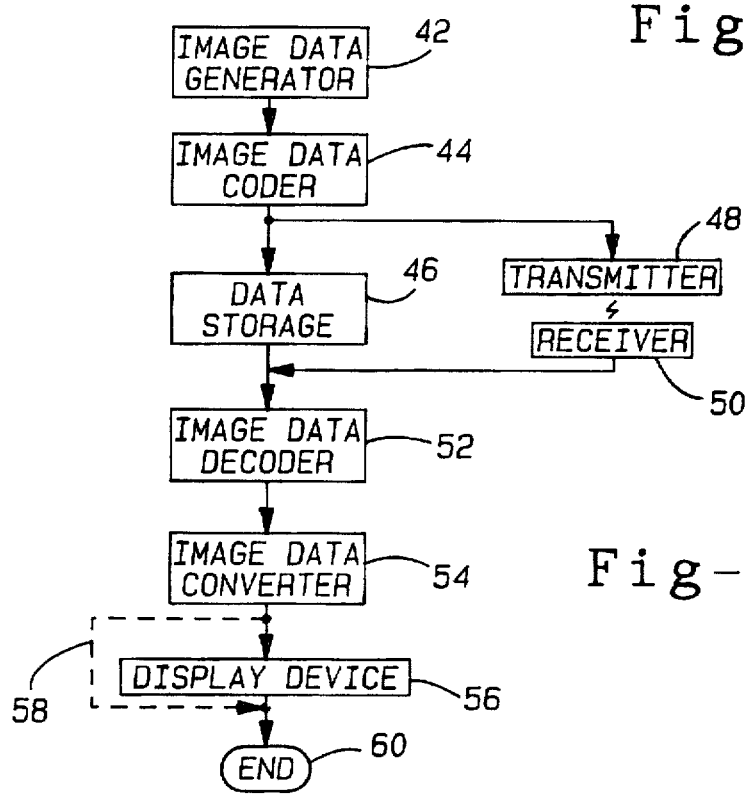
Fig-3
Fig-4

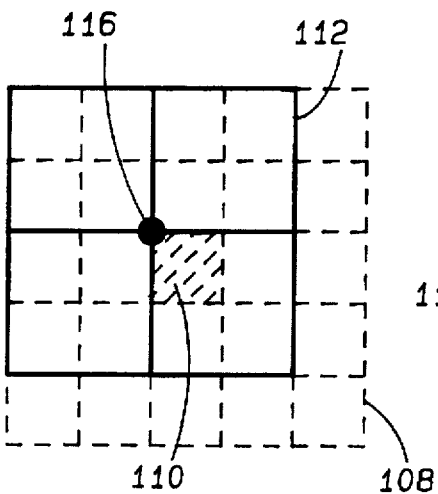 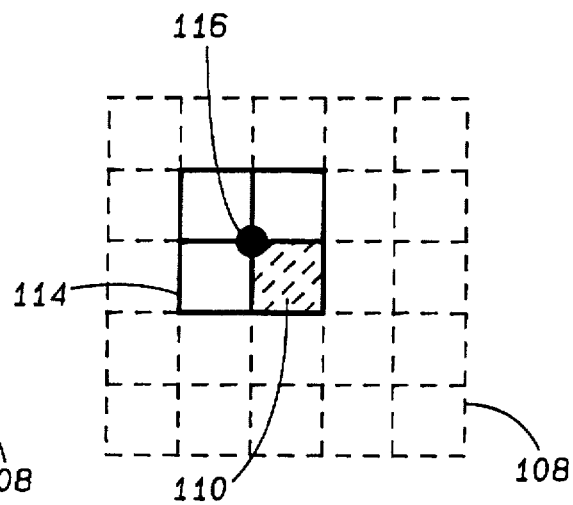
Fig-10a  Fig-10b
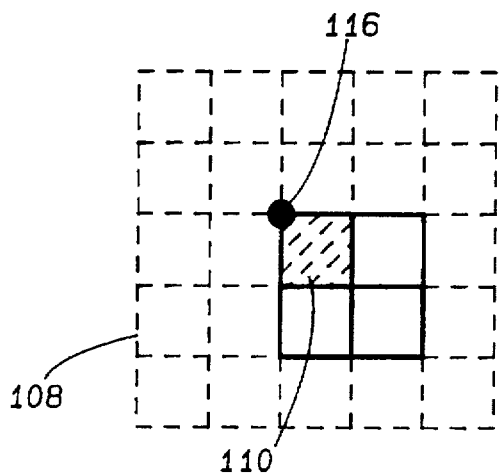 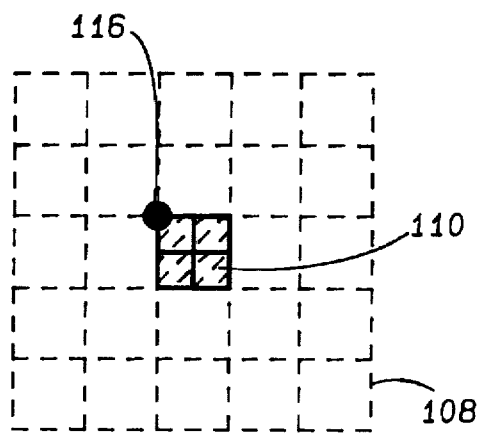
Fig-10c  Fig-10d
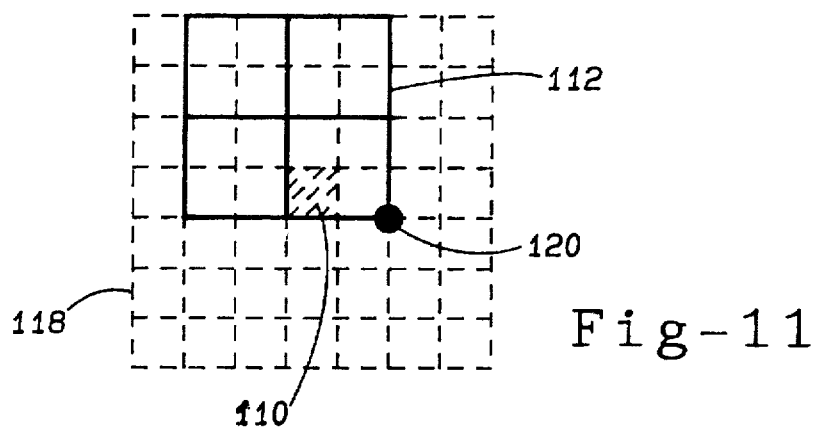
Fig-11

SCALE ORIENTED INTERBAND PREDICTION METHOD FOR IMAGE DATA COMPRESSION AND RECONSTRUCTION

This application is a continuation of application Ser. No. 08/603,693 Filed Feb. 20, 1996, abandoned, which is a continuation of application Ser. No. 08/349,161 Filed Dec. 2, 1994, abandoned.

TECHNICAL FIELD

The invention is related to the field of image data compression and reconstruction and, in particular, to a scale oriented interband prediction method for image data compression and reconstruction.

BACKGROUND ART

Pyramid subband decomposition to compress image data is well known in the art. The subband based hierarchical estimations of movement in a sequence of images taught by Chupeau et al in U.S. Pat. No. 5,278,915 describe a typical application of pyramid subband decomposition of digital image data. Chupeau et al discloses the use of predictors that predict from the data contained in one subband the values of the data for the same subband in subsequent frames of a video sequence.

Barnsley and Sloan in U.S. Pat. No. 5,065,447 describe a method for image compression outside the pyramid subband arena. Their method is a fractal based method that makes use of relationships between scaled versions of the image. Alternatively, R. Rinaldo and G. Calvagno, in an unpublished article entitled CODING BY BLOCK PREDICTION OF MULTIRESOLUTION SUBIMAGES (submitted for publication in the IEEE Transactions on Image Processing) describe a type of interband prediction and its use for image compression. The method described by and Calvagno above only predicts between subbands with the same spatial orientation and not jointly between horizontal, vertical, and diagonal subbands at different levels. They aim at predicting large portions of a subband using a single predictor while the aim of this invention is directed to predicting more local behavior with better fidelity.

SUMMARY OF THE INVENTION

The invention is a scale-oriented interband prediction method for image data compression and reconstruction. The object of the invention, when used in conjunction with pyramid subband decomposition of the original image, is to reduce the number of bits required to store or transmit a grayscale or color image. The compression method is in the class of lossy compression schemes in which absolute fidelity in the decompressed image is sacrificed in return for larger amounts of compression.

In the compression phase, the original image data is first transformed in several stages to produce a pyramid subband decomposition. Each stage produces several subband images consisting of one DC subband image and a number of AC subband images associated with various orientations of the highpass filters used to produce them. After the original image is processed in the first stage, each successively higher level in the pyramid is obtained by repeating the same processing on the DC subband from the level immediately below; no further processing is performed on the AC subbands. Because a process known as downsampling is included in the construction of the subband pyramid, the subband at successively higher levels in the pyramid contain fewer and fewer pixels.

Once an N-level pyramid has been constructed, the method of interband prediction contained in this invention is used to generate predictors that produce estimates of the AC subbands. Thus, instead of storing or transmitting the actual AC subband data, the method relies on the estimates of the AC subbands, which are computed from the content of the DC subband. Beginning with the DC subband at Level N, the method predicts the associated Level N AC subbands, recombines the DC and AC subbands to obtain the Level N−1 DC subband, and then repeats the process for successive levels until the bottom of the pyramid is reached and an estimate of the original image is obtained. Rather than impose a single predictor across the entire image, a predictor is defined for each pixel location in the DC subband image for a given level and is used to predict the associated AC subband values at the corresponding location.

The Level N DC subband is stored/transmitted so that the compression and decompression algorithms start with the same data. Since this subband has $_2 2N$ fewer pixels than the original image, substantial compression can be achieved. At some locations, the predicted values differ from the actual AC values by too large an amount, so the compression algorithm determines adjustments to the predictor itself or additive error corrections in order to improve the results.

Information about these corrections are stored/transmitted in an efficient manner and used by the decompression algorithms as it works its way from smaller Level N DC subband image back to an estimate of the original image. Thus, the total storage/transmission requirement is determined by the combination of the Level N DC subband data and the predictor corrections. Predictors that require no correction require no additional storage/transmission.

One advantage of the method is that the interband predictors involve both a gain parameter and a geometry choice, thereby allowing adjustment of both the magnitude and the spatial phase of the predicted AC subband data.

Another advantage is that the choice of gain parameter and geometry is made for each pixel in a given DC subband image. No a priori assumptions are made that would force a particular collection of DC subband pixels all to use the same predictor.

Another advantage is the nonlinear nature of this prediction process. The downsampling process is tantamount to a spatial contraction which causes a given frequency component to be converted to a new component at twice the original frequency. Consequently, the prediction process produces higher-frequency components that are not present in the DC subband image and which are then combined with existing lower-frequency components in the DC subband image.

Another advantage of the method is that the prediction occurs between levels in the subband pyramid rather than within a single level or subband. This imparts a natural directionality to the prediction, from lower-frequency components to higher-frequency components, rather than the more common spatial directionality with its associated causality issues.

Another advantage of the method is that the process for defining and selecting the predictors uses more than just the reduced data set contained in the subband pyramid. In producing and selecting the predictors that yield the estimated Level n AC subband data from the Level n DC subband data, the method recomputes Level n+1 and Level n+2 AC subband data from the Level n DC subband data and retains values that would have been discarded in the conventional downsampling process. Inclusion of this data allows better spatial alignment between data from the different levels, and improves the performance of the prediction process.

Yet another advantage is that the method makes use of the concept of a contraction center in defining the allowed prediction geometries. The contraction center plays a key role in specifying which locations in the Level n+1 and Level n+2 AC subbands are used to compute the predictor gain, and in specifying which locations in the Level n+1 AC subbands are to be used in predicting the Level n AC subbands.

These and other advantages of the scale-oriented interband prediction method will become more apparent from a reading of the specifications in conjunction with the drawings.

BRIEF DESCRIPTION OF THE DRAWINGS

FIG. 3 is a block diagram of a portion of a digital circuit used to implement the decomposition of the image data;

FIG. 4 is a block diagram of the basic system;

FIG. 10a through 10d are 5×5 pixel arrangements used to illustrate allowed geometries and predictor generation;

FIG. 11 is a 7×7 pixel arrangement used to illustrate allowed geometries and predictor generation.

BEST MODE FOR CARRYING OUT THE INVENTION

To set the stage for the interband prediction scheme to which this invention is related, the pyramid subband decomposition that is used to preprocess the image data must be defined. Many methods for subband decomposition are known in the art such as the Quadrature Mirror Filter (QMF) Banks, wavelet methods and the Haar Transform. The key requirement is that, at each stage in the decomposition, the output subbands can be decimated by a factor of 2 and the same strategy be reapplied to the resulting DC subband. The decomposition must be such that the decimated subbands can be recombined to recover the original image.

To illustrate the above, we will use the Haar Transform as an example, although any other pyramid subband technique could be used instead. The Haar basis functions for two dimensional images are illustrated in FIGS. 1a, 1b, 1c and 1d. There are four Haar basis functions, each covering a 2×2 block of image data. The sign of the function at each location in the 2×2 block is illustrated in FIGS. 1a, 1b, 1c and 1d. Each square in the 2×2 block of image data represents an individual pixel. The magnitude of all the values in the basis functions is the same, and depends on how the normalization is defined for the combined forward and inverse forms of the transform.

Figures 1A, 1B, 1C, 1D:
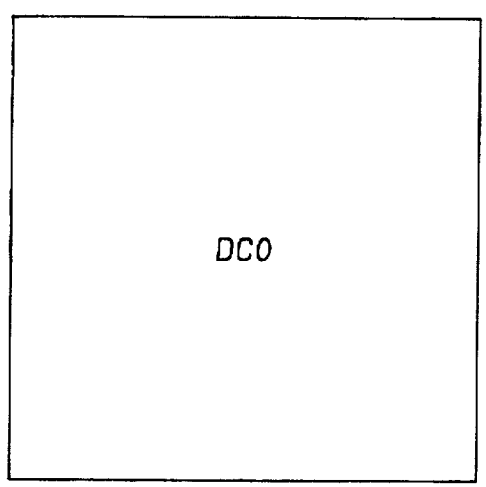
FIGS. 1a through 1d pictorially illustrate the four Haar basis functions.
Figures 2A, 2B:
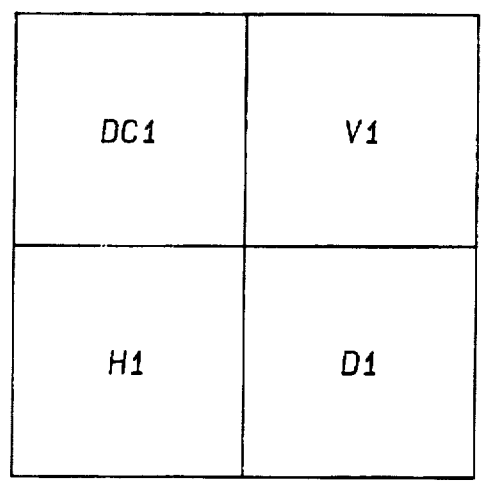
FIGS. 2a through 2d pictorially illustrate a pyramidal subband decomposition of an image.
Figures 2C, 2D:
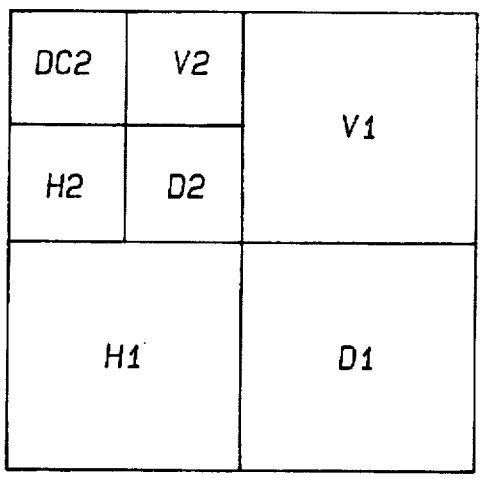

These four basis functions are labeled DC (FIG. 1a), Horizontal (FIG. 1b), Vertical (FIG. 1c) and Diagonal (FIG. 1d), reflecting the fact that they show preferences for spatial frequencies with these orientations. When these functions are convolved with the original image data indicated by the large square, labeled DC0 in FIG. 2a, and the results decimated by a factor of 2 in the horizontal and vertical directions, the result is the four smaller subband images shown in FIG. 2b. In FIG. 2b, the subband image labeled DC1 is the subband image obtained with the DC Haar basis function, while V1 is the subband image produced by the vertical Haar basis function, H1 is the subband image produced by the horizontal Haar basis function and D1 is the subband image produced by the diagonal Haar basis function. The subband images generated using the horizontal, vertical and diagonal Haar functions are collectively called the AC subband images. This notation follows the conventional electrical notation where a signal having a single polarity is a DC signal and where a signal that varies between positive and negative values such as the standard household electrical supply, is referred to as an AC signal. Since the DC Haar function has only positive values, the resulting subband image is called a DC subband image. However, because the horizontal, vertical and diagonal Haar functions as shown in FIG. 1 have both positive and negative components, these subband images are collectively referred to as the AC subband images. FIG. 2c shows a comparable further decomposition of the DC1 subband image shown in FIG. 2b. This decomposition of the DC1 subband image produces subband images DC2, V2, H2 and D2 as shown in FIG. 2c. In a like manner the decomposition of the DC2 subband image produces subband images DC3, V3, H3 and D3 as illustrated in FIG. 2d. Assuming the image DC0 is an image having M×M pixels, the DC subband image DC1 has M/2×M/2 pixels. In a like manner, the subband image DC2 has M/4×M/4 pixels, and the DC subband image DC3 has M/8×M/8 pixels. The horizontal, vertical and diagonal AC subband images each have the same number of pixels as their associated DC subband image which is at the same level in the pyramid.

To recover the original image from the subband pyramid images, the process can be reversed. For example, subband images DC3, H3, V3 and D3 can be recombined to generate subband image DC2. In a like manner, these four subband images DC2, H2, V2 and D2 can be recombined to produce subband image DC1 which in turn can be recombined with subband images H1, V1 and D1 to reproduce the original image DC0.

FIG. 3 is a block diagram showing the first two stages of a digital electronic circuit for the filtering and decimation of the original image DC0 according to the pyramid subband decomposition discussed relative to FIGS. 2a, 2b, 2c and 2d. The data from a digital image generator is received by a Horizontal Highpass Filter 10, a Vertical Highpass Filter 12, a Diagonal Highpass Filter 14 and a Lowpass Filter 16. The output of the Horizontal Highpass Filter 10, is decimated by an associated 2x Down Sampler 18 to produce the subband image H1. In a like manner the output of the Vertical Highpass Filter 12 is received by an associated 2x Down Sampler 20 to generate the subband image V1, the output of Diagonal Highpass Filter 14 is decimated by a 2x Down Sampler 22 to generate subband image D1 and the output of Lowpass Filter 16 is decimated by a 2x Down Sampler 24 to generate the subband image DC1.

The subband image DC1 is then filtered by Horizontal Highpass Filter 26, Vertical Highpass Filter 28, Diagonal Highpass Filter 30 and Lowpass Filter 32 and then decimated by 2x Down Samplers 34, 36, 38 and 40 to produce subband images H2, V2, D2 and DC2 respectively as shown in FIG. 2C. The filtering and decimation is continued one more time to produce the subband images H3, V3, D3 and DC3 as shown in FIG. 2d. The Horizontal Highpass Filters 10 and 26 are identical to each other. In a like manner, Vertical Highpass Filters 12 and 28, Diagonal Highpass Filters 14 and 30, and Lowpass Filters 16 and 32 are identical to each other.

Since the subband image DC3 contains only 1/64 as many pixels as the original image DCO, the number of pixels that need to be stored or transmitted is 1/64 of the number of pixels in the original image if an acceptable level of prediction is available to restore subband image DC3 to an estimated final image corresponding to the original image DCO. Due to errors introduced by the prediction of the associated AC subband images, differences are expected between the estimated final image and the original image. This estimated final image will have the same number of pixels as the original image.

The method for producing an acceptable level of prediction will be discussed relative to the block diagram shown in FIG. 4 and the method illustrated in flow diagrams of FIG. 5 through FIG. 9. This method is applicable to color as well as gray scale images. Referring first to FIG. 4 there is shown the basic components used in the image coding and decoding process of the invention. An image data generator 42, such as a video camera tube or any other type of image data generator known in the art can is used to generate the image data DCO, preferable in the form of a matrix of individual pixels. The generated image data is then coded, by an Image Data Coder 44. The coded image data may then be stored in a data storage 46, or transmitted to a remote location by a transmitter 48 or both. The process executed by the Image Data Coder 44 will be discussed relative to the flow diagrams illustrated in FIGS. 5 and 7.

The coded image data extracted from either the data storage 46 or received from a receiver 50 is decoded by an Image Data Decoder 52 to generate decoded image data. The decoded image data is then converted by an image data converter 54 to image data corresponding to the image data generated by the Image Data Generator 42. If a visual image is required, the image data is converted to a visual image by the image display device 56 such as a cathode ray tube or printer. However, if a visual image is not required, the process will bypass the image display device 56 as indicated by dashed line 58 and end as indicated by block 60.

Figure 5:
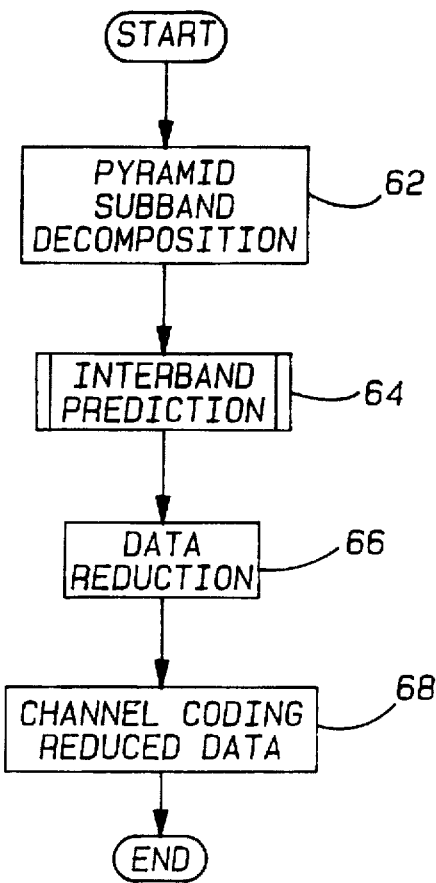
FIG. 5 is a flow diagram of the process executed by the image data coder.

The details of the process executed by the Image Data Coder 44 are shown on FIG. 5. The process begins with the pyramidal subband decomposition of the original image data as indicated by block 62. The pyramidal subband decomposition of the image data has been previously described relative to FIGS. 1, 2 and 3. After the pyramidal subband decomposition, the Image Data Coder 44 will execute the subroutine Interband Prediction 64, then execute a data reduction routine, block 66. The data will then be channel coded, block 68 for storage or transmission.

Figure 6:
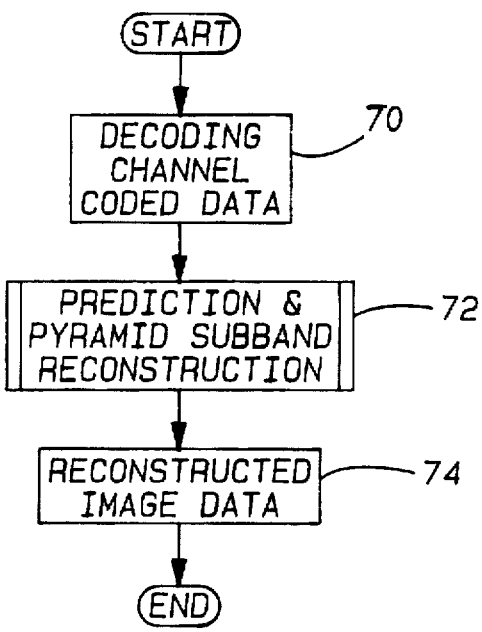
FIG. 6 is a flow diagram of the process executed by the image data decoder.

The details of the process executed by the Image Data Decoder 52 are shown on FIG. 6. The process of decoding the data received from the data storage 46 or the receiver 50 begins with decoding the channel coded data, as indicated by block 70 then execution of the Prediction & Pyramid Subband Reconstruction routine, block 72. The data resulting from Prediction & Pyramid Subband Reconstruction routine, block 72 is Reconstructed Image Data 74 which may be electronically processed to generate a visual image by the image display device 56 or to extract the desired information.

Figure 7:
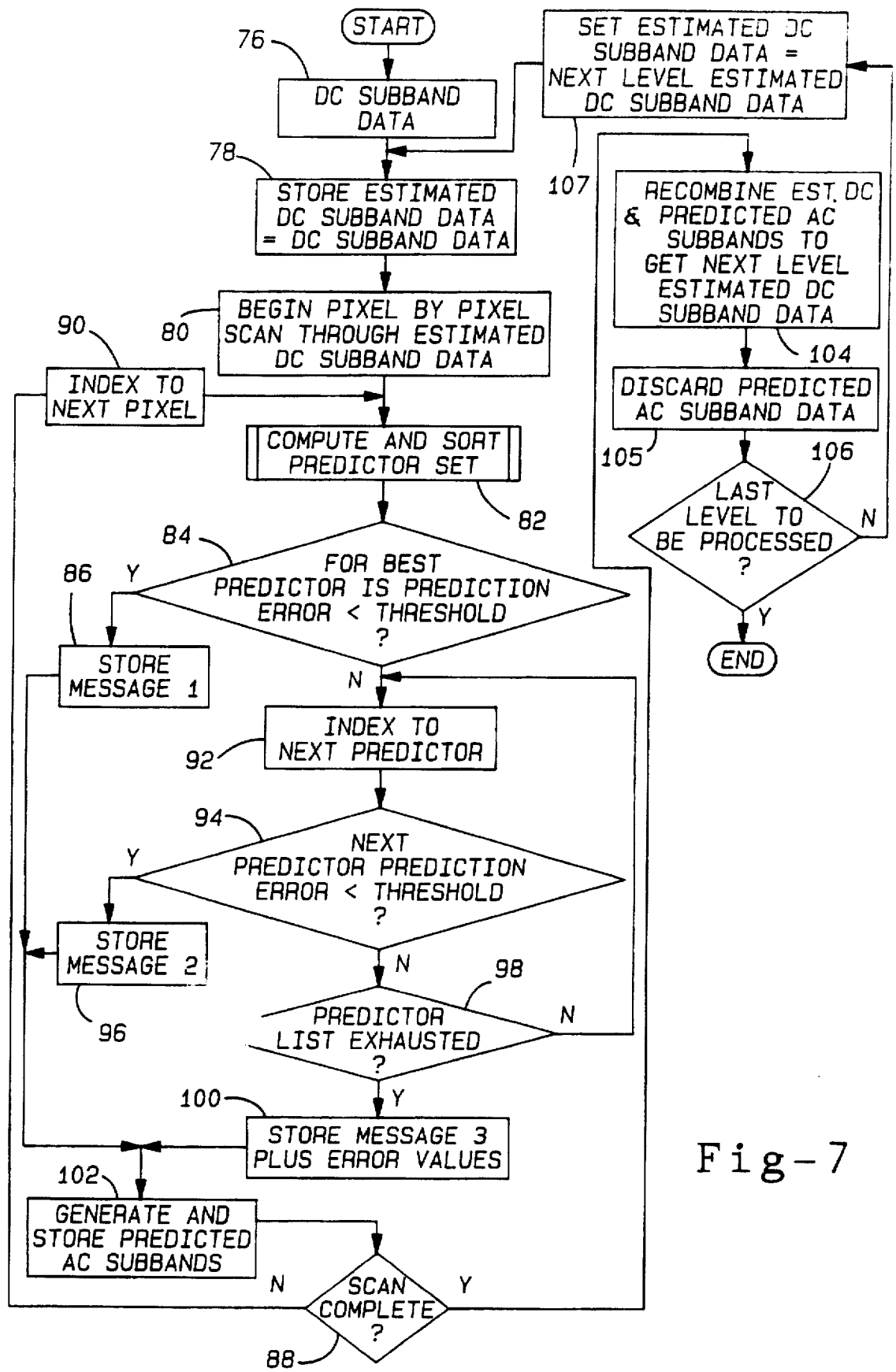
FIG. 7 is a flow diagram of the interband prediction routine.

The details of the Interband Prediction routine 64, of FIG. 5 are shown in FIG. 7. This routine begins by setting the estimated DC subband image equal to the DC Subband produced by the pyramid subband decomposition block 76, and storing it as indicated by block 78. The routine than executes a pixel-by-pixel scan through the stored estimated DC subband as indicated by block 80.

For each pixel the routine then executes a Compute and Sort Predictor Set sub-subroutine indicated by block 82. This sub-subroutine will generate a set of predictors which are sorted and ranked according to a first mean squared error. The Compute and Sort Predictor Set sub-subroutine, block 82 will compute the first mean square error from the DC subband data as shall be explained relative to the flow diagram shown on FIG. 8 and the illustrations showing the various allowed geometries shown on FIGS. 10a through 10d and FIG. 11.

The Interband Prediction routine 64 will then inquire, decision block 84, if the value of a second mean square error for the best predictor, i.e., the highest ranked predictor in the associated predictor set, is less than a predetermined threshold value. The second mean square error is the mean square error between the predicted AC subband image and the AC subband image at the same level obtained in the pyramid decomposition of the original image. When the second mean squared error for the best predictor is less than the threshold value, this routine will generate and store a Message 1, block 86, then inquire, decision block 88, if the scan is complete? If the scan is not complete, the Interband Prediction routine will index to the next pixel, block 90, in the pixel-by-pixel scan of the stored estimated DC subband. Message 1 will signal that the highest ranked predictor in the associated predicator set is the one to be used in the Prediction and Pyramid Reconstruction subroutine 72 as shall be hereinafter explained.

If the second mean square error of the best predictor is greater than the threshold, decision block 84, then the Interband Prediction routine 64 will index to the next highest ranking predictor, block 92, then inquire, decision block 94 if the value of the second mean square error of the next highest ranking predictor is less than the threshold. If it is, this routine will store a Message 2 associated with that particular pixel identifying that that predictor is to be used in the reconstruction process. Message 2 identifies which predictor is to be used without having to generate a ranked list of predictors. The available predictors are initially generated in the form of an unranked list and Message 2 contains a position index in this unranked list. After storing the Message 2, the Interband Prediction routine 64 will inquire if the scan is complete, decision block 88, and proceed accordingly.

When the second mean square error of the next predictor is greater than the threshold, the Interband Prediction routine 64 will inquire decision block 98 if the predictor list is exhausted. If the predictor list is exhausted, this routine will store a Message 3 plus the error values associated with the best predictor in the predictor set, block 100 then proceed to inquire if the scan was complete, block 88. When the predictor set is not exhausted, the Interband Predictor routine will return to block 92 and index to the next predictor. This process will repeat for each predictor set until a Message 1, 2 or 3 has been generated for each pixel in the estimated DC subband.

After each message is generated, blocks 86, 96 or 100 the Interband Prediction routine will generate and save the predicted AC subband image pixels for the present location as indicated by block 102. The AC subband images, as previously indicated, are the H, V and D subband images. Once the scan is complete, block 88 the Interband Prediction routine 64 will then recombine the estimated DC and predicted AC subband images to generate the next-lower-level estimated DC subband image as indicated in block 104. The predicted AC subband image data is then discarded as indicated by block 105 because it is no longer needed. The Interband Predictor routine 64 will next inquire, decision block 106 if the generated next-lower-level estimated DC subband is the last level to be processed in the reconstruction of the estimated DC subband image desired as indicated in FIG. 2. The last level of reconstruction preferably is when the estimated DC subband image has the same number of pixels as the original DCO image data. However, it is to be understood that the desired final level of reconstruction may have a number of pixels less than the number of pixels in the original image. If so, the Interband Prediction routine will end, otherwise the Interband Prediction routine will repeat until predictor sets and messages have been generated for the reconstruction of the estimated DC subband equivalent to the initial image data have been generated.

Figure 8:
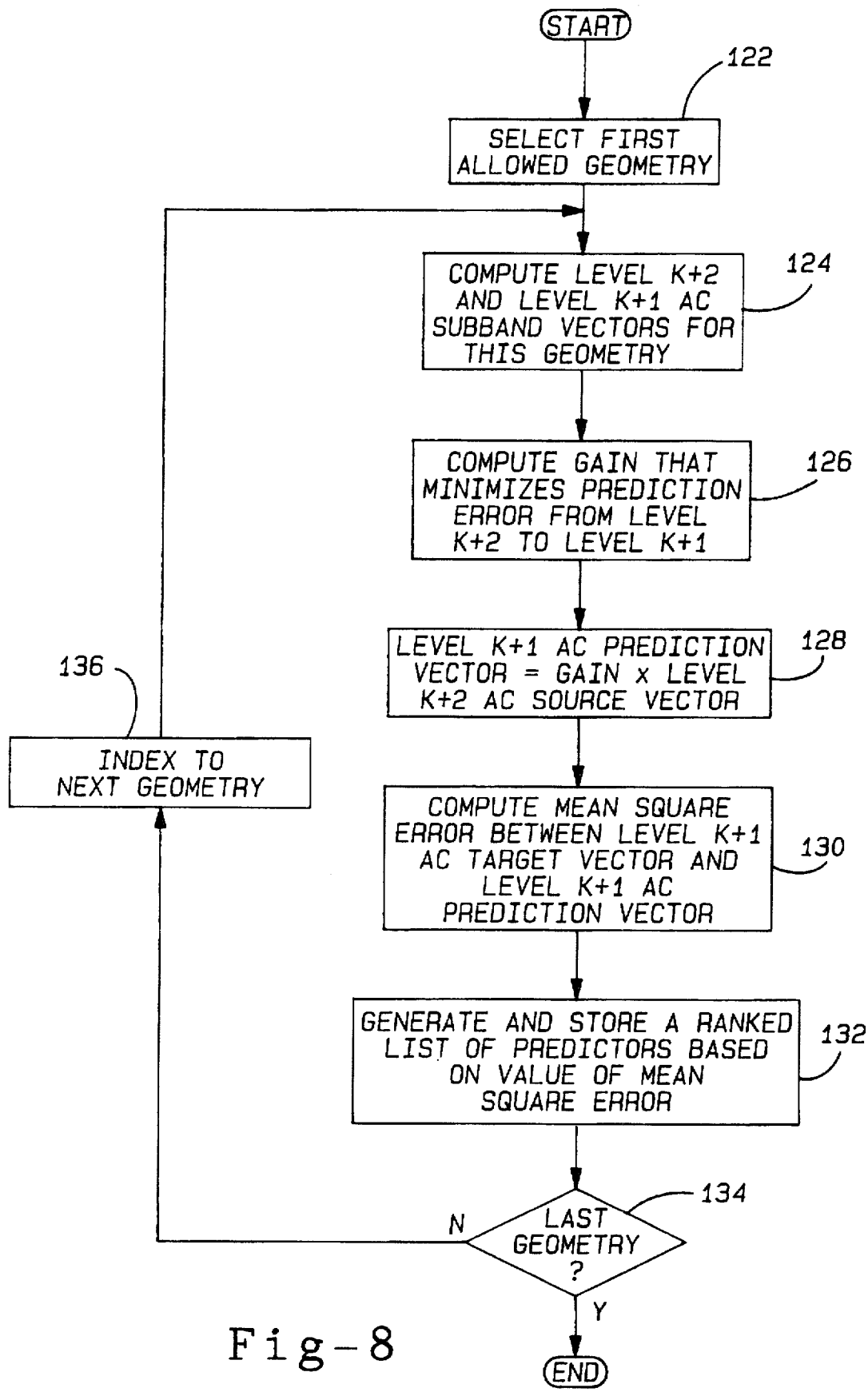
FIG. 8 is a flow diagram of the compute and sort predictor set list subroutine.

The details of the Compute and Sort Prediction Set subroutine 82 of the flow diagram shown on FIG. 7 is shown on FIG. 8. The Compute and Sort Predictor Set subroutine 82 begins by selecting a first allowed geometry, block 122, for the pixel for which the predictor is being generated.

The allowed geometries and the generation of predictors will be explained relative to FIGS. 10a, 10b, 10c, 10d and 11. To illustrate the concept of allowed geometries consider a 5×5 block of pixels 108 from the DC subband image, indicated schematically in FIG. 10d. The shaded pixel 110 is the location where we wish to estimate Hd, Vd, and Dd. DCd, Hd, Vd and Dd were computed using the 2×2 block of more closely spaced pixels positioned as shown by the heavily lined portion of FIG. 10d.

To establish the predictor for the values of Hd, Vd and Dd at this location, we first compute two sets of Haar coefficients using the DCd subband data and two sets of Haar basis functions whose relative sizes are indicated in FIGS. 10a and 10b. To obtain the first set of Haar coefficients, the AC Haar basis functions 112 are laid over the indicated 4×4 portion of the 5×5 block of pixels 108 from the DC image. Similarly, a second set of Haar coefficients is obtained by laying the AC Haar basis functions 114 over the indicated 2×2 portion of the 5×5 block of pixels from the DC data shown in FIG. 10b. A comparison of FIGS. 10a and 10b show that the two sets of AC Haar basis functions are scaled replicas of one another, as if the Haar basis functions of FIG. 10b had been obtained by contracting the Haar basis functions of FIG. a by a factor of 2 about the point covered by the dot 116. The dot 116 will be referred to, hereinafter, as the contraction center. The Haar coefficients for each of the three AC Haar basis functions are generated once for the arrangement given in FIG. 10a and again for the arrangement in FIG. 10b. The Haar coefficients from FIG. 10a may be referred to as Ha, Va and Da and from FIG. 10b as Hb, Vb and Db.

These two sets of Haar coefficients are now used to define a predictor. A coefficient a is computed such that $\alpha$ {Ha, Va, Da} is a minimum-mean-square estimate of {Hb, Vb, Db}. The predictor is thus defined in terms of $\alpha$ and the contraction center as follows:

The 2×2 portion of the 5×5 block of pixels from the DC data shown in FIG. 10c is used to compute the vectors {Hc, Vc, Dc}. This particular 2×2 portion is chosen because if it were contracted by a factor of 2 about the contraction center 116, it would look like the heavily lined pattern shown in FIG. 10d. $\alpha$ {Hc, Vc, Dc} is then used to predict the vector {Hd, Vd, Dd} using the value of $\alpha$ computed above. It is to be noted that the 2×2 blocks shown in FIGS. 10b and 10c are not the same. The vector {Hb, Vb, Db} is referred to as the target vector since it is the prediction target used to determine $\alpha$, while the vector {Hc, Vc, Dc} is referred to as the source vector, since it is used as a source of information to predict vector {Hd, Vd, Dd}.

In the example shown on FIGS. 10a through 10d the contraction center might have been located at any one of the four corners of the shaded pixel 110. The same conceptual strategy can be used to define four predictors, each with a different contraction center and its own value for $\alpha$.

These four predictors can be ranked to form the predictor set, on the basis of the mean squared error between {Hb, Vb, Db} and $\alpha$ {Ha, Va, Da} for each of the four arrangements (geometries) shown in FIGS. 10a through 10d.

In the preferred embodiment, the generation of the predictors is based on a 7×7 block of pixels 118 as illustrated in FIG. 11. In this case, there are 16 possible contraction centers, some of which allow more than one relative position for the Haar basis functions resulting in 36 possible predictor geometries. The contraction center, dot 120, is not always at a corner of the shaded pixel 120 as illustrated in FIGS. 10a through 10d but may be displaced from the shaded pixel 110 as shown in FIG. 11. Thus, the final prediction may be generated from a 2×2 area of the image within the 7×7 block of pixels which does not include the shaded pixel 120. This can be very desirable, therefore the preferred embodiment uses the set of 36 predictors instead of the smaller set of 4 predictors discussed relative to FIGS. 10a through 10d.

Returning to FIG. 8 and assuming the algorithm is processing the Level K DC subband, the first allowed geometry is selected, and the Compute and Sort Predictor Set subroutine 82 proceeds to compute Level K+2 and level K+1 AC subband vectors for the allowed geometry, as described above, then proceeds to compute the gain a that minimizes the prediction error from Level K+2 to level K+1, block 126. The Level K+1 AC prediction vector equals the computed gain a times the level K+2 AC subband source vector, block 128. The subroutine 82 then proceeds to compute the mean square error between the Level K+1 AC target vector and the Level K+1 AC prediction vector as indicated by block 130. The Compute and Sort Predictor Set subroutine 82 then updates the ranked set of predictors, block 132, based on the value of the mean square error of each generated predictor. The predictors are stored with the predictors having the smallest mean-square errors at the head or top of the predictor set. The predictor at the top of the predictor set is referred to as the highest ranking or best predictor.

The subroutine will then inquire decision block 134 if the predictor for the last allowed geometry has been generated and stored? If so, the subroutine will end, otherwise this subroutine will index to the next allowed geometry, block 136 and will repeat the subroutine until the predictor for each allowed geometry is generated and stored.

Figure 9:
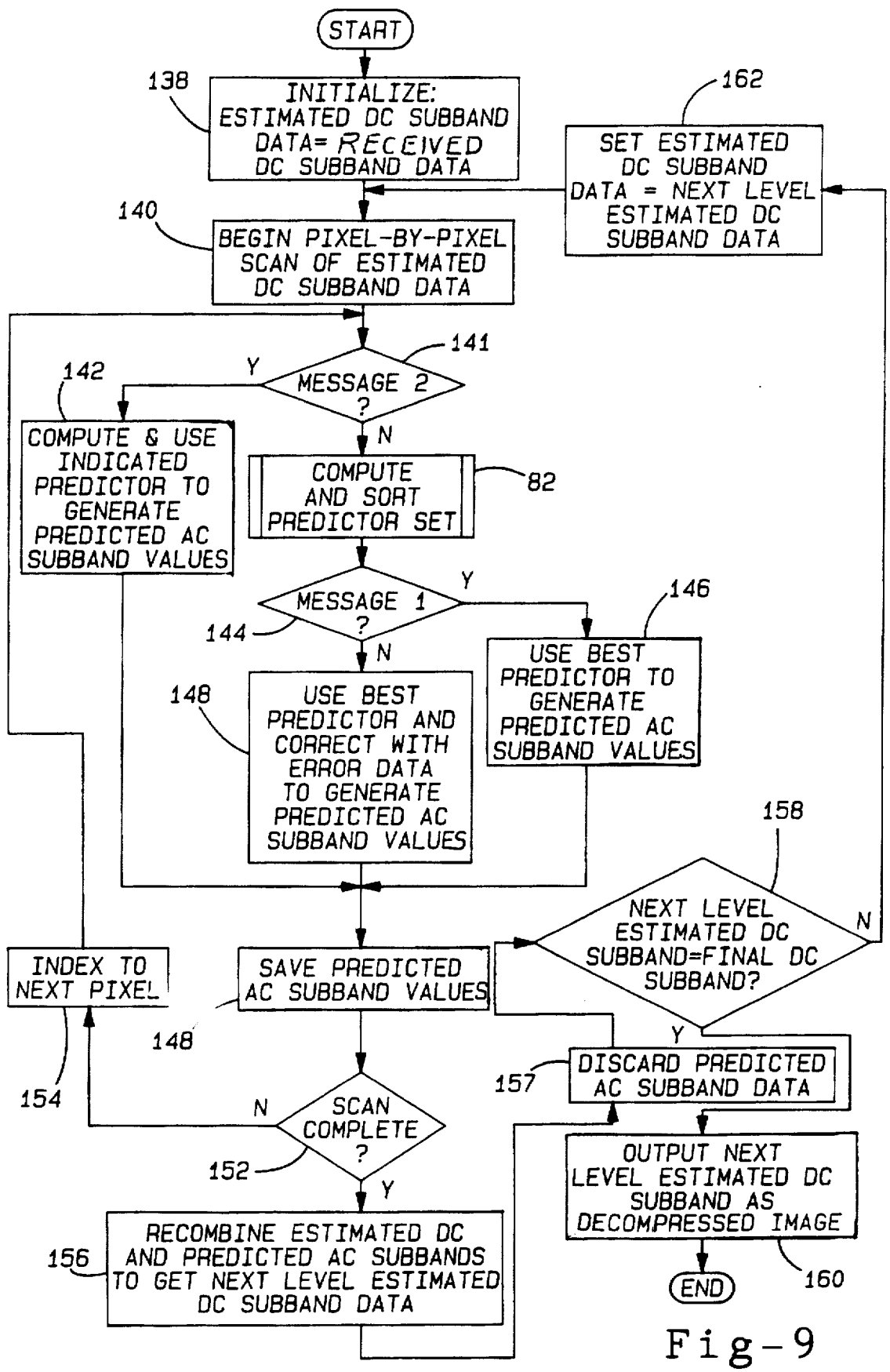
FIG. 9 is a flow diagram of the prediction and pyramid subband reconstruction routine.

The details of the Prediction and Pyramid Subband Reconstruction routine 72 executed in the reconstruction of the image from the transmitted or stored data are shown in FIG. 9. This routine begins by setting the data received, either from storage or from the receiver as the estimated DC subband as indicated by block 138 and then will begin a pixel-by-pixel scan through the estimated DC subband, as indicated by block 140. During the pixel-by-pixel scan, the routine will ask relative to each pixel if a Message 2 has been received, decision block 141. If a Message 2 has been received relative to the pixel currently being scanned, the routine will compute the predictor indicated in the message and use it to generate predicted AC subband values for that pixel. Since the predictor is identified in the message, it is not required to compute and sort a complete predictor set.

The generated predicted AC subband values are then stored, block 150. The predicted AC subband values for all the pixels in the estimated DC subband collectively make up the predicted AC subband images. If Message 2 is not received, the routine will proceed, block 82, to execute the Compute and Sort Predictor Set subroutine 82 discussed relative to FIG. 8. In this manner, the Image Data Decoder 52 has the same predictor sets ordered in the same way as the Image Data Coder 44.

After executing the Compute and Sort Predictor Set subroutine, the Prediction and Pyramid Subband Reconstruction routine 72 proceeds to inquire, decision block 144, if a Message 1 has been received. If so, the routine will use the highest ranked or best predictor in the generated predictor set to generate the associated predicted AC subband values which are stored as indicated by block 150. If neither a Message 1 or Message 2 is received relative to the pixel currently being scanned, then by default the received message must be a Message 3. Alternatively, the Prediction and Pyramid Subband Reconstruction routine 72 may inquire if the received message is Message 3 but this step may be used only as an error check. If the message is a Message 3, the routine will then use the best predictor in the predictor set corrected with the error data contained in Message 3 to generate the predicted AC subband values which are stored as indicated by block 150. The routine will then inquire, decision block 152, if the scan is complete. If not, the routine will index to the next pixel, block 154, and repeat the above-described procedure until predicted AC subband values for each pixel in the estimated DC subband are generated. As previously indicated, the stored predicted AC subband values for all the pixels in the estimated DC subband constitute the predicted AC subband images.

After the scan is complete, the routine will recombine the estimated DC and the predicted AC subbands to produce the next level estimated DC subband, block 156. After the next level estimated DC subband image is generated, the routine will discard the AC subband data as indicated by block 157, then the routine will inquire decision block 158 if this is the final reconstruction level. If so, the routine will output the next level DC subband as the reconstructed image; otherwise, the routine will set the next level DC subband as the estimated DC subband, block 162, and the Prediction and Pyramid Subband Reconstruction routine 72 will repeat until the final reconstruction level is reached.

There appears to be a lot of calculations required to get the prediction of the AC subband data. In the case of the 7×7 pixel block, 36 potential predictors may have to be computed and ranked. However, many of these calculations are also required when the predictors at adjacent pixels are being determined. Instead of repeating these calculations for the adjacent pixels, they can be saved and reused, significantly reducing the computational requirements. Additionally, the order in which the various predictors are evaluated can be changed based on which predictor was used in the preceding level of the pyramid. By doing so, the number of predictors that have to be considered before one that satisfies the error threshold can be found can be significantly reduced.

As described, the process converts the three element AC subband vector {H, V, D} into a single message providing a first degree of data compression. Significantly greater compression is obtained by taking advantage of the statistics of the sequence of messages that occur. In practical application, Message 1 occurs much more frequently than Message 2 or 3, and also occurs in bunches. Therefore, methods such as run length encoding can be used to substantially reduce the data associated with the messages. Other entropy-based techniques can also be applied to the message sequences to further reduce the data rate and increase the amount of compression.

Having described a preferred interband prediction method for subband image decomposition and reconstruction, it is recognized that those skilled in the art may make certain changes or improvements with the scope of the invention set forth in the claims.

What is claimed is:

1. A scale oriented interband prediction method for image data comprising the steps of:

converting an original image into a digital image having a first set of pixels;

decomposing said first set of pixels of said digital image into a second set of pixels using a recursively defined pyramid subband decomposition process, said second set of pixels comprising an N-level collection of more than one AC subband image and a single Level N DC subband image, with the total number of pixels in said second set of pixels equal to the total number of pixels in said first set of pixels;

calculating from said Level N DC subband image a ranked set of predictors for each pixel in said Level N DC subband image to estimate pixel values in Level N AC subband images which are at a level in said recursively defined pyramid subband decomposition process, the same as said Level N DC subband image;

selecting from said ranked set of predictors, a preferred predictor for each pixel;

generating predicted Level N AC subband images from said Level N DC subband image and said preferred predictors;

recombining said Level N DC subband image and said predicted Level N AC subband images to produce an estimated DC subband image at the next-lower numbered level of said recursively defined pyramid subband decomposition process and;

repeating said steps of calculating, selecting, generating and recombining using said estimated DC subband image until a desired level of said pyramid subband decomposition process has been processed and an estimate of said original image is obtained.

2. The method of claim 1 wherein the Haar transform is used to perform said steps of decomposing and recombining.

3. The method of claim 1 wherein said step of calculating a ranked set of predictors comprises the steps of:

decomposing a level K DC subband image to generate Level K+1 and Level K+2 AC subband images, which are not downsampled and have the same number of pixels as the Level K DC subband image, for K=N, . . . , 1;

forming Level K+2 AC source vectors from said non-downsampled Level K+2 AC subband image and Level K+1 AC target vectors from said non-downsampled Level K+1 AC subband image, the elements of said source and target vectors being pixel values taken from corresponding spatial locations in the respective Level K+2 and Level L+1 AC subband images;

associating a Level K+2 AC source vector, with a Level K+1 AC target vector, to form a set of associated Level K+2 AC source vectors and Level K+1 target vectors based on a contractive geometrical relationship which is defined in terms of both a contraction center and a geometrical mapping between the two groups of pixels in the Level K DC subband image that contribute to said Level K+2 AC source vector and said Level K+1 AC target vector;

defining a finite set of said associated Level K+1 AC target vectors and Level K+2 AC source vectors at each pixel in the DC subband image, by limiting the number of contraction centers and the allowed geometrical mappings between pixel groups, so that only a finite set of allowed predictors is generated;

optimizing a predictor for each allowed pair of associated Level K+1 AC target vectors and Level K+2 AC source vectors to generate a set of allowed predictors so that each predictor of said set of allowed predictors forms a best estimate of said Level K+1 AC target vector based on said associated Level K+2 source vector, with said optimization conducted in terms of an objective function; and ranking the set of allowed predictors, based on the value of said objective function used in said optimization process to generate a ranked list of predictors, such that the first predictor in said ranked list of predictors is the predictor that produces the best objective function value, followed by the other predictors ranked according to decreasing quality of the objective function.

4. The method of claim 3 wherein said objective function is the total squared error between the predicted Level K+1 AC target vector and the actual Level K+1 AC target vector.

5. The method of claim 3 wherein said step of optimizing a predictor includes the step of calculating a scalar coefficient that multiplies a Level K+2 AC source vector to produce a predicted value for the Level K+1 AC target vector, with the scalar coefficient chosen so as to minimize the squared error between the predicted and the actual values of the Level K+1 AC target vector.

6. The method of claim 1 wherein the step of selecting the preferred predictor comprises the steps of:

calculating the predicted Level K AC subband vector for a given predictor, starting with the predictor at the top of the ranked list of predictors;

computing a quality index determined from the predicted Level K AC subband vector, the actual Level K AC subband vector and the same objective function as used in optimizing the predictor;

comparing the quality index to a preset threshold value to determine if said quality index is smaller than said threshold value;

repeating said steps of calculating, computing and comparing for each predictor in said ranked list of predictors until a predictor is found that has a quality index smaller than said threshold value;

identifying said predictor having a quality index smaller than said threshold value as a preferred predictor, and defaulting to said first predictor in said ranked list as said preferred predictor when none of the allowed predictors yields a quality index value that is less than said threshold value.

7. The method of claim 1 wherein the step of generating predicted AC subband images comprises the steps of:

decomposing the level K DC subband image to generate Level K+1 AC subband images without downsampling so that each said Level K+1 AC subband image contains the same number of pixels as said Level K DC subband image, for K=N, . . . , 1;

forming Level K+1 AC source vectors, from said non-downsampled Level K+1 AC subband images, the elements of said Level K+1 source vectors being pixel values taken from corresponding spatial locations in the Level K+1 AC subband images;

selecting the proper Level K+1 AC source vector to be used in predicting the Level K AC target vector, for each pixel in the Level K DC subband image, based on the contractive geometrical relationship associated with said previously selected preferred predictor; and using said preferred predictor and said selected Level K+1 AC source vector to generate said predicted Level K AC images.

8. A scale-oriented interband prediction method for image data compression and reconstruction comprising the steps of:

converting an original image to a digital image having a first set of pixels;

decomposing said first set of pixels of said original digital image into a second set of pixels using a recursively defined pyramid subband decomposition process, said second set of pixels comprising an N-level collection of more than one AC subband image and a single Level N DC subband image, with the total number of pixels in said second set of pixels equal to the total number of pixels in said first set of pixels;

converting said second set of pixels into a hybrid set of data containing each pixel of said Level N DC subband image plus a sequence of messages that specify how estimates of the N-Level AC subband images are to be obtained from said Level N DC subband image;

reducing the number of bits required to specify said hybrid set of data to generate compressed data, via lossless compression strategies that take advantage of the statistics of said Level N DC subband image and the sequence of messages;

generating said estimated N-Level AC subband images from said Level N DC subband image and said sequence of messages; and recombining the Level N DC subband image with the estimated AC subband images to produce an estimate of said digital image.

\* \* \* \* \*